Nov. 6, 1934. E. E. NORMAN 1,979,340
VALVE OPERATING MECHANISM
Filed Sept. 16, 1932  3 Sheets-Sheet 3
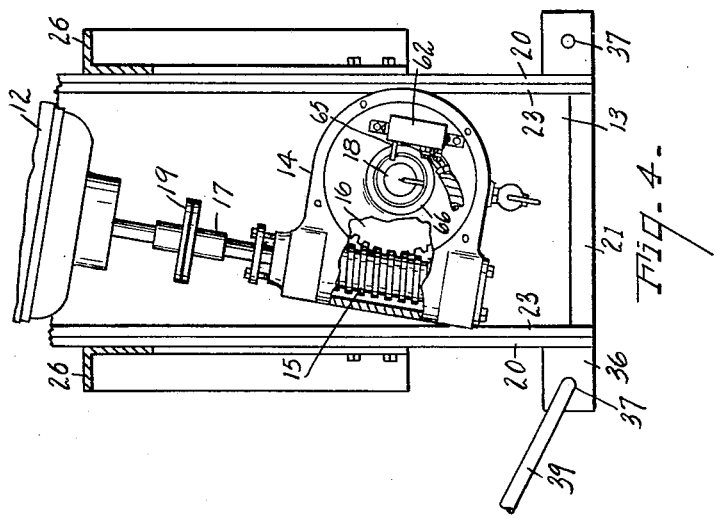
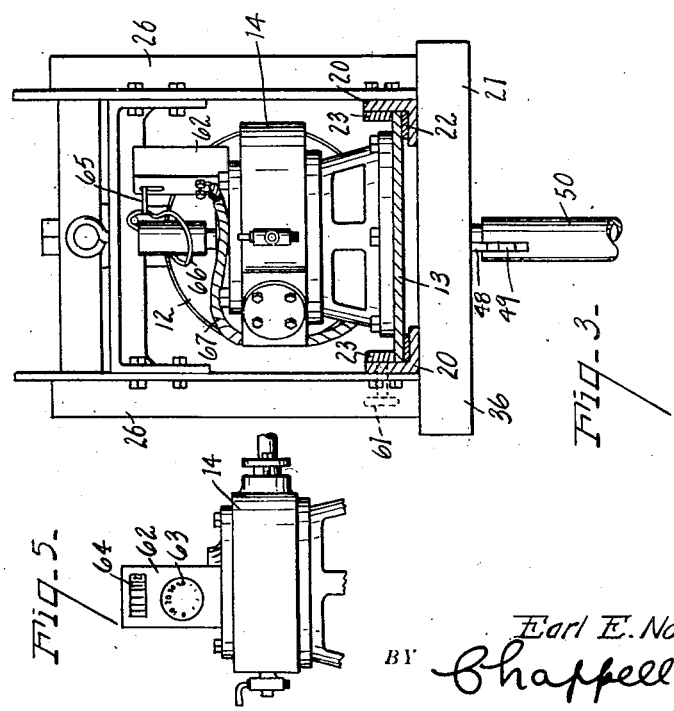
INVENTOR
Earl E. Norman
BY Chappell & Earl
ATTORNEYS Patented Nov. 6, 1934

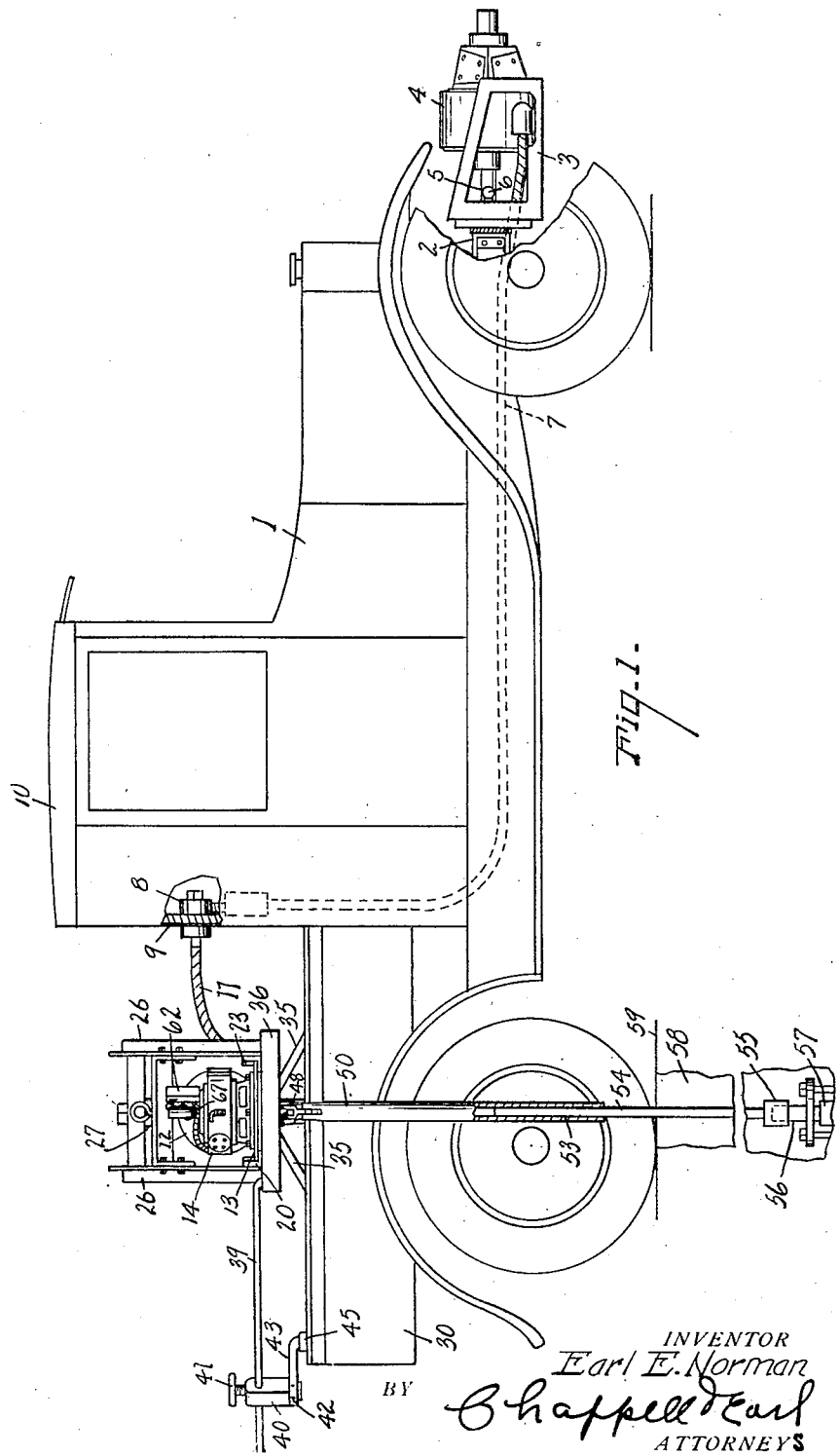

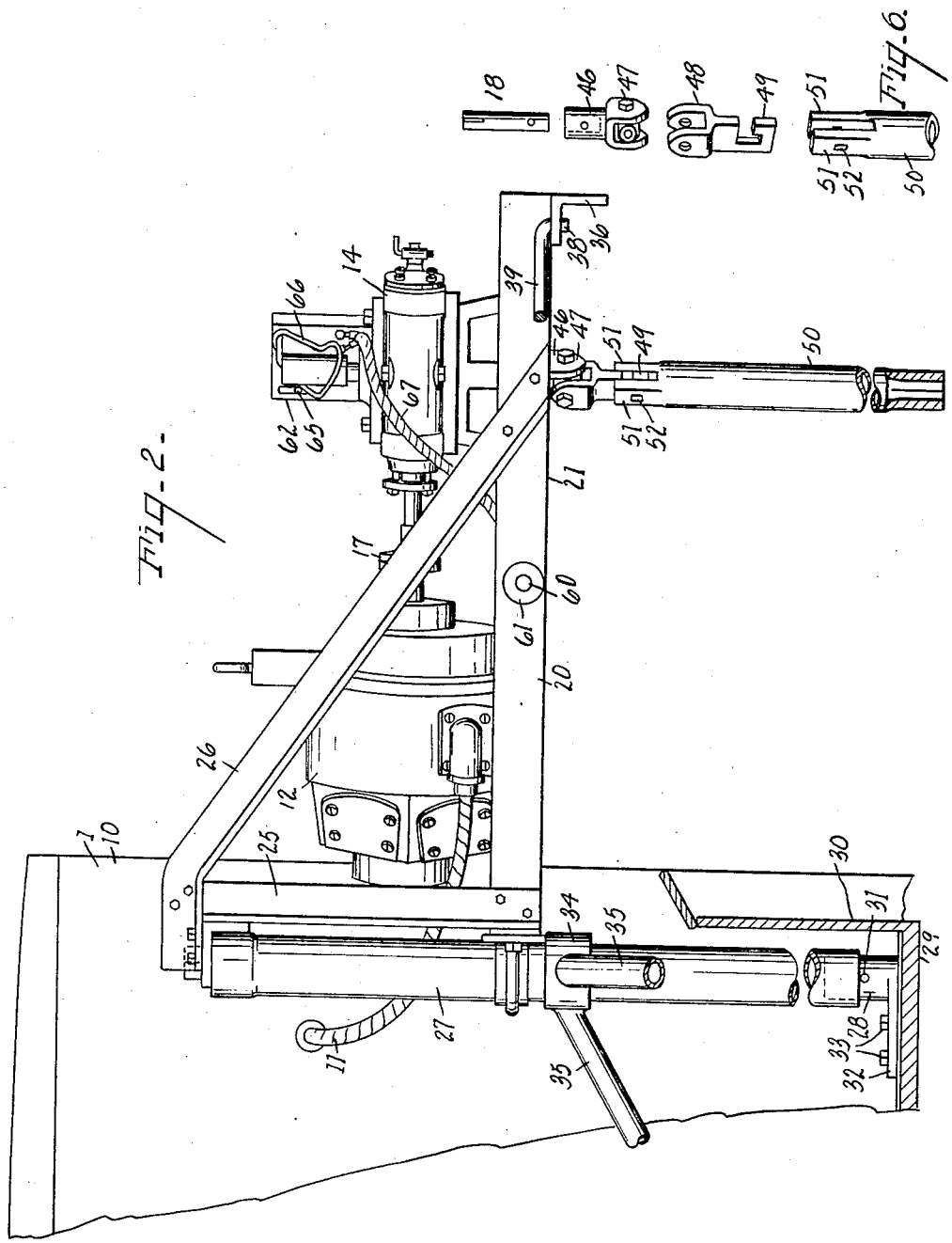

1,979,340

UNITED STATES PATENT OFFICE 1,979,340

VALVE OPERATING MECHANISM

Earl E. Norman, Kalamazoo, Mich.

Application September 16, 1932, Serial No. 633,539

5 Claims. (Cl. 81—54)

The main objects of this invention are:

First, to provide a power driven wrench for actuating heavy duty valves such as water main valves and the like.

Second, to provide a device of this character which is portable and which may be readily positioned so as to be connected to stationary water system valves and the like.

Third, to provide a power wrench having a torque indicator associated therewith for indicating when the valve is jammed or fully actuated.

Fourth, to provide a device of this character which may be used to actuate heavy duty valves with little likelihood of breaking the latter or the mechanism.

Fifth, to provide a motor for actuating the tool, which slows down in response to an increase in the tool torque.

Sixth, to provide a power driven valve operating mechanism having these desirable features, which is simple and economical in its parts and efficient and effective in operation.

Objects relating to details and economies of my invention will appear from the description to follow. The invention is defined and pointed out in the claims.

A structure which is a preferred embodiment of my invention is illustrated in the accompanying drawings, in which:

Fig. 1 is a fragmentary view mainly in side elevation of an automotive truck having my improved power driven wrench mechanism associated therewith, parts being broken away and shown in vertical section.

Fig. 2 is an enlarged fragmentary view in vertical section and end elevation.

Fig. 3 is an enlarged detail partially vertical transverse section.

Fig. 4 is an enlarged fragmentary plan view, a portion of the reducing gear housing being broken away and shown in horizontal section.

Fig. 5 is an enlarged fragmentary front elevation of the gear housing showing the revolution counter and ammeter or torque indicator mounted thereon.

Fig. 6 is a fragmentary perspective view of disassembled part of the tool drive spindle.

Referring to the drawings, 1 is a conventional illustration of an automotive truck having a chassis frame 2, to the front end of which is secured the bracket or generator supporting frame 3. The bracket 3 carries a direct current generator 4 which is connected to the main drive shaft 5 of the truck through the clutch 6, the arrangement being such that the generator may be disconnected from the power unit of the vehicle when not in use. A conductor cable 7 connects the generator 4 to the switch 8 mounted on the rear wall 9 of the cab or driver's compartment 10 so as to be accessible to the operator. A second conductor cable 11 connects the switch 8 to the direct current series motor 12 which is mounted on the sliding base plate 13.

Also mounted on the base plate 13, is a gear housing 14 containing the worm gear 15 and the gear wheel 16, the former being connected to the motor by the flexible coupling 17 and the latter being connected to the vertical shaft 18 which depends below the base plate 13. A hand wheel 19 is carried by the flexible coupling 17 for adjusting the position of the vertical shaft 18 manually.

The base plate 13 is slidably carried by the angle members 20 which constitute way members and the longitudinal members of the adjustable frame or bracket 21, bearing members 22 being disposed between the base plate 13 and the horizontal arms of the angle members 20 for providing a smooth supporting surface for the base plate. Side rails 23 are secured to the insides of the vertical arms of the angle members 20 to limit movement of the base plate 13 to a horizontal plane. The bracket 21 comprises the spaced members 20, vertical members 25, and inclined braces 26 bolted together and secured to the vertical cylindrical support 27 which is rotatably carried by the post 28 on the floor 29 of the body 30 of the truck. The lower end of the cylindrical support 27 rests on the pin 31, the post 28 having a base 32 which is secured to the floor 29 of the truck by bolts 33. A stationary collar 34 surrounds the support 27 substantially midway between the ends thereof and is provided with inclined braces 35, the lower ends of which are secured to the truck body 30. The front ends of the support members 20 are connected by the cross angle member 36 which is provided with holes 37 at the ends thereof for receiving the downturned end 38 of the tie rod 39, the latter being slidably carried by the block 40 which is provided with a set screw 41 for securing the tie rod 39 in an adjusted position. The block 40 is pivoted at 42 to the arm 43 which is supported by the socket member 45 on the truck body. With these parts, the frame or bracket 21 may be swung outwardly over the side of the truck body and secured in adjusted position by means of the tie or brace rod 39. The brace or tie rod may be used in similar manner to secure the frame in its adjusted position on the opposite side of the truck body, the downturned end 38 of the tie rod being shiftable from one hole 37 to the other.

On the lower end of the shaft 18 is one member 46 of a universal joint 47, the other member 48 being provided with a flat tang 49 hooked for supporting and driving the tool spindle 50. The upper end of the tool spindle is forked for receiving the tang 49, the upwardly projecting fork members 51 being flat and provided with a cross pin 52 for engaging the hook of the tang. The lower portion of the tool spindle 50 is provided with a non-circular preferably rectangular socket 53 for receiving the shank 54 of the tool 55, a socket wrench being illustrated. The tool shank 54 is longitudinally slidable within the tool spindle 50, the arrangement being such that a plurality of tools of different length may be used with the same tool spindle. In Fig. 1, numeral 56 indicates the stem of the water main valve 57 which is located in a manhole 58 below the surface 59. The socket wrench 55 is preferably made large so as to provide a loose fit on the stem 56 so as to provide in effect a second universal joint.

In one of the frame members 20, is mounted a set screw 60 having a hand wheel 61 for securing the base plate 13 in its adjusted position on its support.

An instrument casing 62 is mounted on the top of the gear housing 14 and is provided with an ammeter 63 and a revolution counter 64. The revolution counter 64 is actuated by the cam follower pin 65 and the cam 66, the latter being carried by the upper end of the shaft 18 and arranged so as to actuate the pin 65 on each revolution of the shaft 18. The ammeter 63 is connected by means of the conductor cable 67 to the supply circuit of the series motor 12. In a direct current series motor, the current or load is substantially directly proportional to the torque so that the ammeter 63 constitutes a tool torque indicator by means of which the operator is informed of the full actuation or jamming of the valve 57, an abnormal current indicating that the valve is fully opened or closed or jammed. In this event, the operator immediately opens the switch 8 or stops the power unit of the automotive vehicle which is under his control during the operation of the device.

In setting up the device for operation, a tool 55 of the proper length is engaged with the stem 56 of the valve to be operated as 57. The frame 21 is then swung so as to position the tang 49 as nearly as possible above the tool. Further adjustment is obtained by moving the base plate 13 on the frame 21. When the shaft is properly centered with respect to the tool, the tool spindle 50 is placed on the tool and engaged with the tang 49, the latter being rotated to a proper receiving position by means of the hand wheel 19. If the movement required is more than a quarter of a turn, the tool spindle 50 may be removed from the tool and changed to the nearest quarter position. After this, the set screws 41 and 60 are tightened so as to secure the frame and the sliding base plate 13, respectively, in their adjusted positions. The engine of the automobile is then started and the switch 8 is closed. When the valve has been actuated as desired, the switch 8 is opened and the parts may be returned to their carrying positions. It will be understood that the motor is provided with a reversing switch or is a reversible motor so that the valve may be both opened and closed.

An important feature of the invention resides in the fact that any unusual torque, such as that caused by the jamming of the valve 57 or its complete closing or opening or jamming is indicated immediately by the ammeter 65, and when this occurs, the power may be immediately disconnected by the operator by opening the switch 8. If desired, automatic means, such as a relay and circuit breaker, may be used for this purpose, but I prefer, from a practical standpoint, not to use such devices for the reason that in some cases it is necessary for the operator to use his own personal judgment in applying power to the valve. In some cases, it may be necessary to use a great deal of power, while in others only a slight amount of power would be required depending on the size and condition and type of valve. A series motor is highly desirable for driving the tool for the reason that as its torque increases its speed decreases, thereby applying the heavier torque more slowly to the valve, which often results in releasing it if stuck. Heretofore, it has required two men about three quarters of an hour to open or close some water main valves. With my device, it requires only approximately a minute and a half to open or close the same valve and this may be done without injury to the valve or machine.

I have illustrated and described my improvements in an embodiment which I have found very practical. I have not attempted to illustrate or describe other embodiments or adaptations, as it is believed that this disclosure will enable those skilled in the art to embody or adapt my improvements as may be desired.

Having thus described my invention, what I claim as new and desire to secure by Letters Patent is:

1. A portable power wrench for valves, comprising a power truck, a direct current generator driven by the power unit thereof, a series motor mounted on said truck and connected to said generator, a wrench driven by said motor, and an ammeter in the generator-motor circuit for indicating the torque on the tool.

2. In a valve operating mechanism, the combination with a motor vehicle and its power unit, of a direct current generator having driving connections to said power unit, a wrench, a direct current series motor connected to said generator and having driving connections to said wrench and an ammeter on the motor generator circuit for indicating the torque on the wrench.

3. In a valve operating mechanism, the combination with a wrench, of a series motor having driving connections to said wrench, and an ammeter in the motor circuit for indicating the torque on the wrench.

4. A valve operating mechanism comprising in combination an internal combustion engine, a direct current generator driven by said engine, a motor connected to said generator, the current input of said motor being substantially proportional to its torque output, a wrench driven by said motor, and an ammeter in the circuit connecting the motor to said generator for indicating the torque output of said motor.

5. A valve operating mechanism for heavy duty valves which are subject to sticking and consequent breakage when operated, comprising a valve wrench, a direct current series motor for driving said wrench, the speed of said motor varying inversely with the resistance offered by said valve to turning, whereby a sticking valve is released by a powerful but slow torque without damage, a direct current generator operatively associated with said motor, an engine for driving said generator, and an ammeter in the motor-generator circuit for indicating the torque exerted by the motor on said valve, such torque being controlled by the speed of said engine.

EARL E. NORMAN.